(12) United States Patent
Smith et al.

(10) Patent No.: US 10,127,300 B2
(45) Date of Patent: Nov. 13, 2018

(54) MAPPING RELATIONSHIPS USING ELECTRONIC COMMUNICATIONS DATA

(71) Applicant: International Business Machines Corporation, Armonk, NY (US)

(72) Inventors: Barton A. Smith, Campbell, CA (US); Fei Wang, San Jose, CA (US); Wei Zhang, Ossining, NY (US); Michelle X. Zhou, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 891 days.

(21) Appl. No.: 14/138,799

(22) Filed: Dec. 23, 2013

(65) Prior Publication Data

US 2015/0178373 A1     Jun. 25, 2015

(51) Int. Cl.
| | |
|---|---|
| *G06F 17/30* | (2006.01) |
| *G06Q 50/00* | (2012.01) |
| *G06Q 10/10* | (2012.01) |
| *H04L 12/58* | (2006.01) |
| *H04L 29/06* | (2006.01) |

(52) U.S. Cl.
CPC .. *G06F 17/30598* (2013.01); *G06F 17/30528* (2013.01); *G06Q 10/10* (2013.01); *G06Q 50/01* (2013.01); *H04L 51/046* (2013.01); *H04L 65/1069* (2013.01); *G06F 17/30867* (2013.01);
(Continued)

(58) Field of Classification Search
CPC ........ G06F 17/30817; G06F 17/30867; G06Q 30/0629; G06Q 3/0935; H04L 67/36; H04L 51/04

USPC ....... 707/719, 722, 732–734, 736, 811, 809; 709/224, 204, 206
See application file for complete search history.

(56) References Cited

U.S. PATENT DOCUMENTS

| | | | |
|---|---|---|---|
| 5,745,591 A | * | 4/1998 | Feldman ............... G06F 3/0395 340/5.83 |
| 7,200,635 B2 | | 4/2007 | Yashchin et al. |

(Continued)

FOREIGN PATENT DOCUMENTS

| | | |
|---|---|---|
| CN | 101026829 A | 8/2007 |
| CN | 101075980 A | 11/2007 |

(Continued)

OTHER PUBLICATIONS

IBM, "PeoplePad | Home", Updated on Jul. 8, 2009, <http://web.opensource.ibm.com/www/bluemeeting/>.
(Continued)

*Primary Examiner* — Frantz Coby
(74) *Attorney, Agent, or Firm* — Stephen R. Yoder

(57) ABSTRACT

A pairwise relationship data set with multiple attributes (such as, who, what, when, where, how) and with the what attribute (also called the topic attribute) having a word dimension and a people dimension. The data in the topic dimension of the what attribute relates to topics (including other people) relating to the specific, human, personal relationship between the first person and the second person of the pairwise pair. The what attribute data is derived by processing basis data, which includes correspondence data (that is, the substance of correspondence that the first and second persons participate in, including instant messaging and e-mail exchanges. Pairwise relationship data is displayed to a user in real time during a chat session.

20 Claims, 11 Drawing Sheets

(52) U.S. Cl.
CPC .. *G06F 17/30914* (2013.01); *G06F 17/30917* (2013.01)

(56) References Cited

U.S. PATENT DOCUMENTS

| | | | | |
|---|---|---|---|---|
| 7,529,735 | B2* | 5/2009 | Zhang | G06F 17/30616 |
| 7,680,703 | B1* | 3/2010 | Smith | G06Q 10/06 |
| | | | | 705/26.8 |
| 7,680,888 | B1 | 3/2010 | Marmaros et al. | |
| 7,685,016 | B2* | 3/2010 | Flores | G06Q 10/06 |
| | | | | 705/7.11 |
| 7,917,587 | B2* | 3/2011 | Zeng | G06Q 10/107 |
| | | | | 709/206 |
| 8,019,875 | B1* | 9/2011 | Nielsen | G06Q 10/06 |
| | | | | 709/226 |
| 8,117,085 | B1* | 2/2012 | Smith | G06Q 30/0629 |
| | | | | 705/26.7 |
| 8,249,996 | B1* | 8/2012 | Nallasivan | G06Q 10/06 |
| | | | | 705/321 |
| 8,688,716 | B1* | 4/2014 | DuHadway | G06F 17/30817 |
| | | | | 707/719 |
| 8,831,276 | B2* | 9/2014 | Martinez | G06K 9/00664 |
| | | | | 382/103 |
| 8,947,197 | B2* | 2/2015 | Craymer | G06Q 20/341 |
| | | | | 340/5.2 |
| 2002/0073343 | A1 | 6/2002 | Ziskind et al. | |
| 2003/0210265 | A1 | 11/2003 | Haimberg | |
| 2004/0260781 | A1* | 12/2004 | Shostack | G06Q 30/02 |
| | | | | 709/207 |
| 2005/0132298 | A1 | 6/2005 | Lueckhoff et al. | |
| 2006/0184481 | A1* | 8/2006 | Zhang | G06F 17/30616 |
| | | | | 706/45 |
| 2007/0192299 | A1* | 8/2007 | Zuckerberg | G06Q 10/10 |
| 2008/0040475 | A1* | 2/2008 | Bosworth | G06Q 30/08 |
| | | | | 709/224 |
| 2008/0104225 | A1* | 5/2008 | Zhang | H04L 67/36 |
| | | | | 709/224 |
| 2008/0120411 | A1* | 5/2008 | Eberle | G06Q 50/10 |
| | | | | 709/225 |
| 2008/0288349 | A1 | 11/2008 | Weisberg et al. | |
| 2009/0031027 | A1* | 1/2009 | Abernethy, Jr. | G06Q 10/10 |
| | | | | 709/227 |
| 2009/0177644 | A1* | 7/2009 | Martinez | G06F 17/30864 |
| 2009/0198530 | A1* | 8/2009 | O'Sullivan | G06Q 10/06 |
| | | | | 705/7.11 |
| 2009/0210497 | A1 | 8/2009 | Callanan et al. | |
| 2009/0248653 | A1* | 10/2009 | Rolls | G06Q 30/02 |
| 2009/0313346 | A1* | 12/2009 | Sood | G06Q 10/10 |
| | | | | 709/207 |
| 2009/0320101 | A1* | 12/2009 | Doyle, III | G06F 21/31 |
| | | | | 726/4 |
| 2010/0005268 | A1* | 1/2010 | Yang | H04L 51/04 |
| | | | | 711/202 |
| 2010/0199340 | A1* | 8/2010 | Jonas | G06Q 10/10 |
| | | | | 726/8 |
| 2010/0199349 | A1 | 8/2010 | Ellis et al. | |
| 2010/0268720 | A1* | 10/2010 | Spivack | G06F 17/3087 |
| | | | | 707/756 |
| 2011/0179118 | A1 | 7/2011 | Dean et al. | |
| 2011/0282648 | A1 | 11/2011 | Sarikaya et al. | |
| 2012/0047217 | A1 | 2/2012 | Hewes et al. | |
| 2012/0158552 | A1* | 6/2012 | Smith | G06Q 30/0629 |
| | | | | 705/27.2 |
| 2012/0203846 | A1 | 8/2012 | Hull et al. | |
| 2013/0046828 | A1 | 2/2013 | Grewal et al. | |
| 2013/0173531 | A1 | 7/2013 | Rinearson et al. | |
| 2014/0012905 | A1* | 1/2014 | Roche | H04L 51/36 |
| | | | | 709/204 |
| 2014/0237057 | A1 | 8/2014 | Khodorenko | |
| 2014/0258399 | A1* | 9/2014 | Bradley | H04L 12/185 |
| | | | | 709/204 |
| 2015/0113621 | A1* | 4/2015 | Glickfield | H04L 63/08 |
| | | | | 726/7 |

FOREIGN PATENT DOCUMENTS

| | | |
|---|---|---|
| CN | 104731842 A | 6/2015 |
| CN | 102713952 A | 10/2016 |

OTHER PUBLICATIONS

IBM, "PeoplePad | Features, Demo & Screenshots", Updated on May 15, 2012, <http://web.opensource.ibm.com/www/bluemeeting/demo.html>.

Lu et al., "Information at your fingertips: contextual IR in enterprise email", IUI '11 Proceedings of the 16th international conference on Intelligent user interfaces, pp. 205-214, ACM New York, NY, USA Copyright 2011, ISBN: 978-1-4503-0419-1, doi>10.1145/1943403.1943434, <http://dl.acm.org/citation.cfm?id=1943434>.

Nardi et al., "Interaction and Outeraction: Instant Messaging in Action", CSCW '00: Proceedings of the 2000 ACM conference on Computer supported cooperative work, Dec. 2000, Philadelphia, PA, pp. 79-88, doi>10.1145/358916.358975.

Wikipedia, "AOL Instant Messenger—Wikipedia, the free encyclopedia", Initial release May 1997, page last modified May 1, 2013, <http://en.wikipedia.org/wiki/AOL_Messenger>.

Wikipedia, "Facebook Messenger—Wikipedia, the free encyclopedia", Initial release Aug. 2011, page last modified on May 8, 2013, <http://en.wikipedia.org/wiki/Facebook_messenger>.

Wikipedia, "Google Talk—Wikipedia, the free encyclopedia", Initial release Aug. 24, 2005, page last modified on Apr. 19, 2013, <http://en.wikipedia.org/wiki/Google_talk>.

Wikipedia, "IBM Lotus Sametime—Wikipedia, the free encyclopedia", Stable release 8.5.2 / May 18, 2011, page last modified on Apr. 9, 2013, <http://en.wikipedia.org/wiki/IBM_Lotus_Sametime>.

Wikipedia, "ICQ—Wikipedia, the free encyclopedia", Initial release Nov. 1996, Stable release 8.0.6008 / Mar. 22, 2013, page last modified on May 7, 2013, <http://en.wikipedia.org/wiki/ICQ>.

Wikipedia, "Instant messaging—Wikipedia, the free encyclopedia", page last modified on May 8, 2013, <http://en.wikipedia.org/wiki/Instant_messaging>.

Wikipedia, "Pairwise comparison—Wikipedia, the free encyclopedia", page last modified on Feb. 28, 2013 at 19:35, <http://en.wikipedia.org/w/index.php?title=Pairwise_comparison&oldid=541320922>.

Wikipedia, "tf-idf—Wikipedia, the free encyclopedia", page last modified on Jun. 29, 2013 at 13:59, <http://en.wikipedia.org/wiki/Tf-idf>.

Wikipedia, "Windows Live Messenger—Wikipedia, the free encyclopedia", Initial release Jul. 22, 1999 as MSN Messenger, page last modified on May 7, 2013, <http://en.wikipedia.org/wiki/Msn_messenger>.

Zhou et al., "Finding someone in my social directory whom i do not fully remember or barley know", IUI '12 Proceedings of the 2012 ACM international conference on Intelligent User Interfaces, pp. 203-206, ACM New York, NY, USA Copyright 2012, ISBN: 978-1-4503-1048-2, doi>10.1145/2166966.2167001, <http://dl.acm.org/citation.cfm?id=2167001&preflayout=tabs>.

* cited by examiner

| Able's Chatroom | Able's Relationship Helper | User Profile |
|---|---|---|
| Baker: Hi, Able. | You have no relationship with Baker | Baker:  Engineer Division 6 Phone 555-5555 |
| Able: Hello Baker have we met? | | |
| Baker: No, we haven't met, but I just wanted to introduce myself. I am moving into the cubical next door. | | |
| Able: Nice to meet you. | You now have a relationship with Baker | |
| Charlie: Hi, Able | People and words relating to your relationship with Charlie: Daniel, Edna, Fei, relocation, expense, boxes | Charlie:  Accountant Division 2 Phone 555-1234 |
| Able: Charlie, it has been years. When did we do that relocation? 1992? | | |

FIG. 5

MAPPING RELATIONSHIPS USING ELECTRONIC COMMUNICATIONS DATA

BACKGROUND

The present invention relates generally to the field of social networks, and more particularly to understanding relationships within a social network.

Social networks are often made up of various source websites or applications, such as both public and private connections websites. A given user's contacts in that user's social network are not necessarily well known to the user and/or involved in frequent communication with the user. Some contacts are added to the user's social network based only on brief casual encounters, such as attending a social gathering or a group chat session. Some relationships with social network contacts have become distant after long periods of little communication activity. Oftentimes, users from a common corporate directory don't even know each other before becoming social media website contacts and/or before communicating with each other with an instant message.

Instant messaging (IM), also known as a chat session, as a form of communication over the internet, is commonly used in social network sites and as enterprise communication tools. The basic function of instant messaging is to instantly transfer text-based messages back and forth between two chat participants at least substantially in real time. Multimedia messaging (MMS) is now commonly supported in most commercial IM tools. During a group chat session: (i) participants may invite other people to join the chat who are not familiar with the other chat participants; (ii) participants often mention people outside of the user's social network; and/or (iii) participants introduce topics and/or terms which are only understood by a subset of the chat participants.

In conventional chat systems, a chat participant often needs to lookup participant, technology, and subject matter expert (SME) information including: (i) details about chat participants who are barely known; (ii) details about the chat participants that cannot be recalled; and/or (iii) details about the people (such as SMEs) who are related to the topics and/or terms. The chat participant may currently obtain this information by using currently conventional tools and/or techniques including the following: (i) searching online; (ii) searching her contact history; (iii) finding someone's full profile in an enterprise organizational database; (iv) finding the topic-related emails, then identifying the related people in email archives with full text search; (v) finding someone's publications online; and/or (vi) finding someone's connections list in his LinkedIn profile. (Note: the term "LINKE-DIN" may be subject to trademark rights in various jurisdictions throughout the world and are used here only in reference to the products or services properly denominated by the marks to the extent that such trademark rights may exist.)

SUMMARY

A method is presented including: collecting basis data related to a pair of people including a first person and a second person, creating a pairwise relationship data set including a who attribute portion and a what attribute portion, defining the who attribute portion of the pairwise relationship data set by storing (a) first person data related to the identity of the first person, and (b) second person data related to the identity of the second person, and defining the what attribute portion of the pairwise relationship data set by storing topic data, with the topic data being (a) based on the collected basis data, and (b) related to topics relevant to a relationship between the first person and the second person.

BRIEF DESCRIPTION OF THE SEVERAL VIEWS OF THE DRAWINGS

FIG. 5 is a first screenshot generated by the first embodiment system;

DETAILED DESCRIPTION

This Detailed Description section is divided into the following sub-sections: (i) First Embodiment; (ii) Further Comments and/or Embodiments; (iii) The Hardware and Software Environment; and (iv) Definitions.

I. First Embodiment

Preliminary note: The flowchart and block diagrams in the following Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
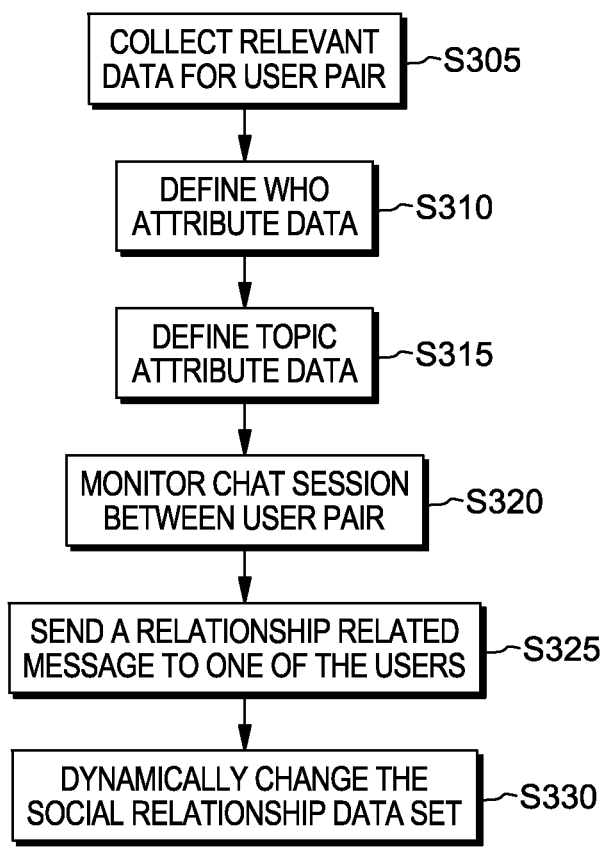
FIG. 3 is a flowchart showing a method performed, at least in part, by the first embodiment system.
Figure 4:
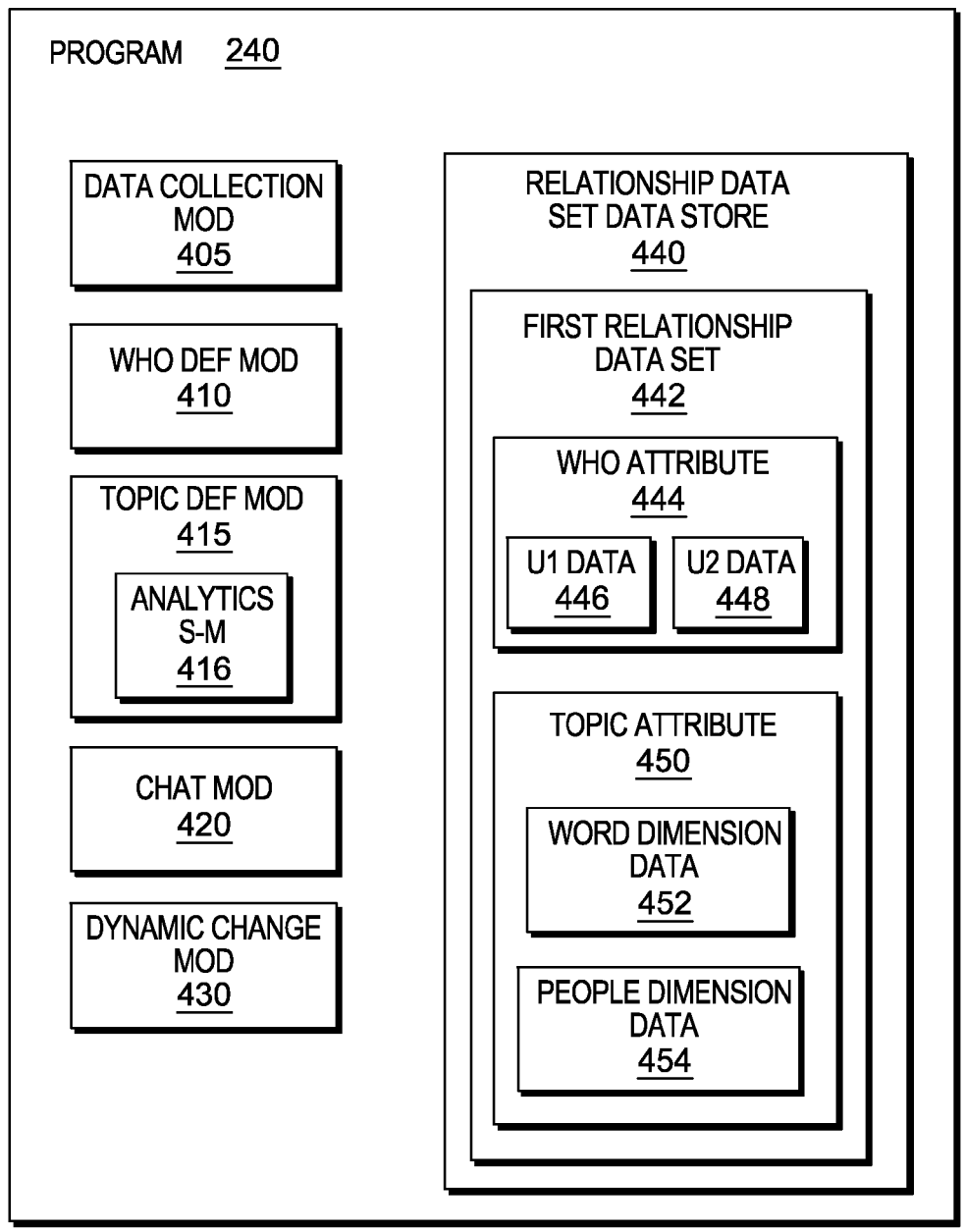
FIG. 4 is a schematic view of a software portion of the first embodiment computer system.

FIG. 3 shows a flow chart 300 depicting a method according to the present invention. FIG. 4 shows program 240 for performing at least some of the method steps of flow chart 300. This method and associated software will now be discussed, over the course of the following paragraphs, with extensive reference to FIG. 3 (for the method step blocks) and FIG. 4 (for the software blocks).

In the method of flow chart 300, there is a relevant user pair, and it is the relationship between this pair of users which is the focus of the method of flow chart 300. At least some embodiments of the present invention are directed to "pairwise relationships," as distinct from relationships among and between members of larger groups. In this example of flow chart 300, there will be discussion of the relationships between two (2) user pairs as follows: (i) Able and Baker; and (ii) Able and Charlie.

Processing begins at step S305, where data collection module ("mod") 405 collects relevant data, including: (i) correspondence data; (ii) user profile data; (iii) published communications data; and/or (iv) public records data. Alternatively, some embodiments may use less than all of these types of relevant data. For example, some embodiments may be limited to the use of correspondence data. Correspondence data for a given user pair is made up of the substance of correspondences (see definition, below, in Definitions sub-section) made or received by at least one user of the user pair. For example, a user's "profile" is not included in the correspondence data because it is not a "correspondence" as that term is herein defined. However, a statement made by a person in a six person chat in a chatroom qualifies as "correspondence."

In this embodiment, mod 405 collects three types of correspondence data as follows: (i) user-to-user-exclusive correspondence between the two users (and only between the two users) of the user pair; (ii) user-to-user-non-exclusive correspondence where each user of the user pair participates (see definition, below, in the definitions sub-section) in the correspondence, but at least one third party also participates in the correspondence; and (iii) third-party correspondence where only one user of the user pair participates in the correspondence. Alternatively, some embodiments may only use correspondence data types (i) and (ii). As a further alternative, some embodiments may only use correspondence data type (i). Some embodiments may "weight" the information gleaned from a given correspondence type, user-to-user-exclusive, user-to-user-non-exclusive or third-party, depending upon its type. For example, type (i) correspondence may be given a greater weight than type (iii) correspondence because type (i) correspondence is generally more relevant to the relationship between the users of a user pair than is type (iii) correspondence.

In this embodiment, and as will be further discussed below in connection with FIG. 5, user profile data is also collected by mod 405 at step S305. User profile data should not be confused with correspondence data, and user profile data is often more general and less granular, with respect to shedding light on a human, personal relationship than is correspondence data.

Published communications data includes (but is not limited to): (i) published articles; (ii) published and printed books; (iii) blogs posts, and/or "replies" that are open to the public (or at least a relatively large segment of the public); (iv) transcripts of public speeches; and (v) an individuals patents and published patent applications. Public communications data should not be confused with correspondence data, and public communications data may be less helpful than correspondence data, with respect to shedding light on a human, personal relationship.

Public records data includes: (i) census data; (ii) property tax records; and (iii) any other data about an individual (besides communications made by or to that individual) that are publicly available. Public communications data should not be confused with correspondence data, and public communications data may be less helpful than correspondence data, with respect to shedding light on a human, personal relationship.

Mod 405 collects relevant data, of various types, from many sources: (i) corporate e-mail; (ii) personal e-mail; (iii) social media website postings; (iv) computer-network-based corporate community sites; (v) corporate employee directory; (vi) telephone conversations (via transcripts); (vii) public IM network; (viii) corporate IM system; (ix) recorded in-person conversations; (x) handwritten or typed letters (which have been converted into machine readable text); (xi) a user's blog; and (xii) the user's posts on blogs of others. Alternatively, additional relevant data sources (from mediums and/or communication channels now known or to be developed in the future) could be added to the set of relevant data collected by mod 405. As a further alternative, fewer than all of the above-listed relevant data could be collected by mod 405. When collecting relevant data, the system designer should ensure that the privacy laws and legitimate privacy expectations are fully respected.

Processing proceeds to step S310, where who definition module 410 defines who attribute data portion 444 of first relationship data set 442 set up in relationship data set data store 440 by storing the relevant data collected in step S305 as U1 data 446 and/or U2 data 448. In this embodiment, there are two types of "attributes" that are used to organize the data of a social relationship data set. These two attributes types are: (i) who type (this who type attribute consists of the two users of the user pair); and (ii) what type (also sometimes herein called the "topic attribute"). In this embodiment, the topic attribute has two sub-types (also called "dimensions"): (i) the people dimension (that is, third parties, not one of the user pair); and (ii) the word dimension (for example, subjects of mutual interest, like baseball). Alternatively, other embodiments of social relationship data sets according to the present disclosure may have additional attribute types (for example, when, how, where) and/or additional dimensions (for example, specific pets) included in the topic attribute. Also, any additional attribute types present in an embodiment may have one or more dimensions.

To explain step S310 in greater detail, step S310 is the beginning of the process of building first relationship data set 442. Relationship data set 442 is a data set that relates to the relationship between two, and only two, human users. By focusing on the relationship between these two users, this makes it more likely that distracting information, which is extraneous to the relationship these users share, will not be included in data set 442. In this embodiment, data store 440 includes only a single relationship data set, but most embodiments would be expected to have a large number of relationship data sets, each respectively corresponding to a pair of users (especially if the pair of users have corresponded and have correspondence data).

At step S310, it is the who attribute data portion 444 of first relationship data set (RDS) that is defined by storing relevant data, specifically the identities of the two users of the user pair. In this embodiment, the who attribute data identifying each of the two users includes: (i) name; (ii) telephone number; (iii) email address; and (iv) mailing address. The first user's who attribute data is stored in U1 data portion 446 of who attribute portion 444 to define the who attribute portion of the pairwise relationship data set. Likewise, the second user's who attribute data is stored in U2 data portion 448 of who attribute portion 444. In the terminology of the present disclosure, the first user represents a first dimension of the who attribute, and the second user represents a second dimension of the who attribute.

Processing proceeds to step S315, where topic definition module 415 defines topic attribute portion 450 of first RDS 442 by storing the relevant data collected in step S305 as word dimension data 452 and/or people dimension data 454. As stated above, in this embodiment, this "what attribute" has two dimensions: (i) people; and (ii) words. The "people dimension" of the "what attribute" should not be confused with the "who attribute" discussed above. The individuals present in the "people dimension" of the "what attribute" are not the people in the pairwise relationship that first RDS 442 characterizes and provides insight into. Rather, the individuals in the "people dimension" of the "what attribute" are part of the subject matter of the relationship between the first and second users.

To explain step S315 in more detail, analytics sub-module 416 of topic definition module 415 applies analysis and analytics to all of the relevant data collected from various sources at step S305 in order to define: (i) word data for word dimension data portion 452 of topic attribute portion 450; and (ii) people dimension data portion 454 of topic attribute portion 450. Some useful people and/or word data may require only simple analysis. For example, user profile data for the two users may indicate that they have the same supervisor at their employment. This would seem to indicate that the supervisor belongs in the people dimension for first RDS 442, as a person of mutual interest to both the first and second users. In contrast, development of some of the useful people and/or word dimension analysis may require more sophisticated analytics processing. For example, the correspondence data collected at step S305 is written in natural language and is originally intended for human reader(s). Therefore, it can be more difficult to determine truly useful topic attribute data from correspondence data. As an example of this, imagine two users who use the slang term "Benjamin Franklin" as a synonym for currency—this should not lead to Benjamin Franklin being considered as a point of people dimension data on the topic attribute of the RDS. Despite the difficulty, when topic attribute data is determined from correspondence data, it is potentially the most useful and most insightful topic attribute data of all from a perspective of really characterizing the personal, human relationship in a meaningful way.

In this embodiment, word data is parsed for those words that are not typically used in communications outside of the pairwise relationship. The words determined to be relevant to the pairwise relationship are stored in the word dimension data set to define the word dimension of the topic attribute. One way that uncommon words are determined is through the use of inverse frequency analysis as discussed in more detail below. Alternatively, word data may be parsed to determine categories of words, such as: (i) preferences; (ii) topics of interest; (iii) activities; and (iv) hobbies.

Analytics sub-module 416 of the topic definition module defines the people dimension by storing relevant people data in people dimension data set 454. The analytics sub-module identifies the people that are associated with a pairwise relationship of the user pair. People dimension data includes, but is not limited to: (i) people (other than the people making up the user pair) who are believed to be related and/or associated with the relationship between the parties; and (ii) people whose names arise as topics of communication by one or both users of the user pair. Alternatively, the two users' social directories are the only sources for people dimension data. In this embodiment, people data module uses inverse frequency analysis to determine a ranking to characterize the "closeness" of a third party to the user pair. Alternatively, inverse frequency analysis is used to determine which people in the user's social directory are most closely associated with the user pair. Inverse frequency analysis is discussed further below.

Processing proceeds to step S320, where chat module 420 monitors online chat activity between the user pair. Monitoring includes: (i) identifying the user pair, or pairwise relationship; (ii) identifying words and people associated with the user pair (using a corresponding relationship data set); (iii) semantic analysis of chat transcript; and/or (iv) determining what relationship data to present to one or more of the users. Alternatively, an online chat involving multiple users may be monitored in such a way that multiple user pairs are identified while monitoring the chat.

Processing proceeds to step S325, where chat module 420 sends a relationship related message to one of the users in the user pair. This embodiment sends a message to one of the users with words and/or people that are associated with the pairwise relationship. Alternatively, the message module may include only data relevant to the current conversation based on semantic analysis of the chat transcript. In this embodiment of the present disclosure, the monitoring and messaging activities occur in real time or near real time during a current chat session.

The monitor module provides the user with relevant relationship prompts in a side bar to the chat window, which is visible to the user during the chat session. Alternatively, the monitor module causes a pop-up window to appear with relevant relationship data during a chat session. Alternatively, a link(s) is provided for the user to select when the user wants to receive prompts from the monitor module. Alternatively, the message may be sent by text message or by e-mail.

Processing proceeds to step S330, where dynamic change module 430 changes the relationship data set for a user pair upon receipt of additional relevant data. In this embodiment, the relationship data set is "dynamic" (the concept of dynamic relationship data sets will be further discussed, below). Dynamic changes include: (i) creating a relationship data set for a new user pair; and/or (ii) updating existing pairwise relationship data sets. Dynamic change module 430 makes dynamic changes based on data input from definition module 410 and topic definition module 415 during a chat session.

Each chat participant is identified with reference to the user's social directory. When a chat participant is not found in the social directory, a new contact and corresponding relationship data set is created. Relevant data is gathered from the ongoing chat as well as any data associated with the new contact's profile, such as: (i) corporate e-mail; (ii) personal e-mail; (iii) social media websites; (iv) corporate communities; (v) telephone calls (via transcripts); (vi) public IM network; and/or (vii) corporate IM system. Alternatively, a user may be prompted to create a relationship data set for a new contact.

FIG. 5 shows screenshot 500 on Able's computer screen during a chat including: Able's chatroom 505; Able's relationship helper 510; and user profile sidebar 515.

The chatroom displays chat participant communications such as participant Baker introducing himself to Able. During the pairwise communication between Baker and Able, relevant data is collected to create a new user pair. The relationship helper tells Able that there is no existing relationship data set for Baker when Baker first contacts Able. However, upon further discussion, the relationship helper has created a relationship data set for the user pair, indicating this action by telling Able that he now has a relationship with Baker. It should be noted that the user profile sidebar provides Baker's corporate directory information upon receipt of Baker's first message.

Another example provided in FIG. 5 is when participant Charlie says hello to Able. Upon receipt of Charlie's first message, the relationship helper displays topic attributes from the existing Able-Charlie relationship data set. Further, the user profile sidebar provides Charlie's corporate directory information. Using the topics provided by relationship helper, Able recalls a relocation from years earlier and is able to seamlessly bring up this topic of which they are both familiar.

II. Further Comments and/or Embodiments

Some embodiments of the present invention recognize that it is inefficient and oftentimes ineffective to use online tools during a chat session to lookup participant, technology, and subject matter expert (SME) information, as mentioned above in the Background section. Some embodiments of the present disclosure: (i) make IM tools more intelligent; (ii) allow people to better know their chatting partners; and/or (iii) allow people to better understand the context of the chatting topic with which some participants are not familiar. Some embodiments of the present disclosure provide a method for: (i) providing participant, technology, and/or subject matter expert (SME) information in real-time; (ii) providing participant, technology, and/or subject matter expert (SME) information that is seamlessly integrated into the messenger software, or other chat-related interface software; (iii) providing participant, technology, and/or subject matter expert (SME) information without interrupting the regular chatting session; and/or (iv) helping the user to understand their chatting partner or the chatting topics, to make the messenger software "smarter." Some embodiments of the present disclosure address user-friendliness issues (such as improving the user interface or user experience) with a user's relationship model.

One method according to the present disclosure includes the following steps (not necessarily in the following order): (i) collect a user's social networks; (ii) collect user activities in their social networks; (iii) build a relationship model that can be seen and utilized only by the user; (iv) perform offline relationship analytics on the user's social network data; (v) establish an index on the user's contacts; and (vi) determine related topics associated with each of the user's contacts.

Some embodiments of the present invention, when the user is chatting with someone with IM tools, spontaneously collect: (i) profiles of the participants in the chat session; (ii) profiles of the people mentioned in the text of the chat session; and/or (iii) text messages. Some embodiments of the present invention send the collected profiles and text messages to the relationship model to find related people and other contents. The related people and related content are prompted instantaneously on the side of IM tool so that the user can easily find related people and content from the side window, keeping the chat moving efficiently and without any interference on the regular chat session.

Some embodiments of the present invention improve and/or facilitate the following: (i) communication efficiency; (ii) workplace collaboration; and/or (iii) business workflow.

Figure 6:
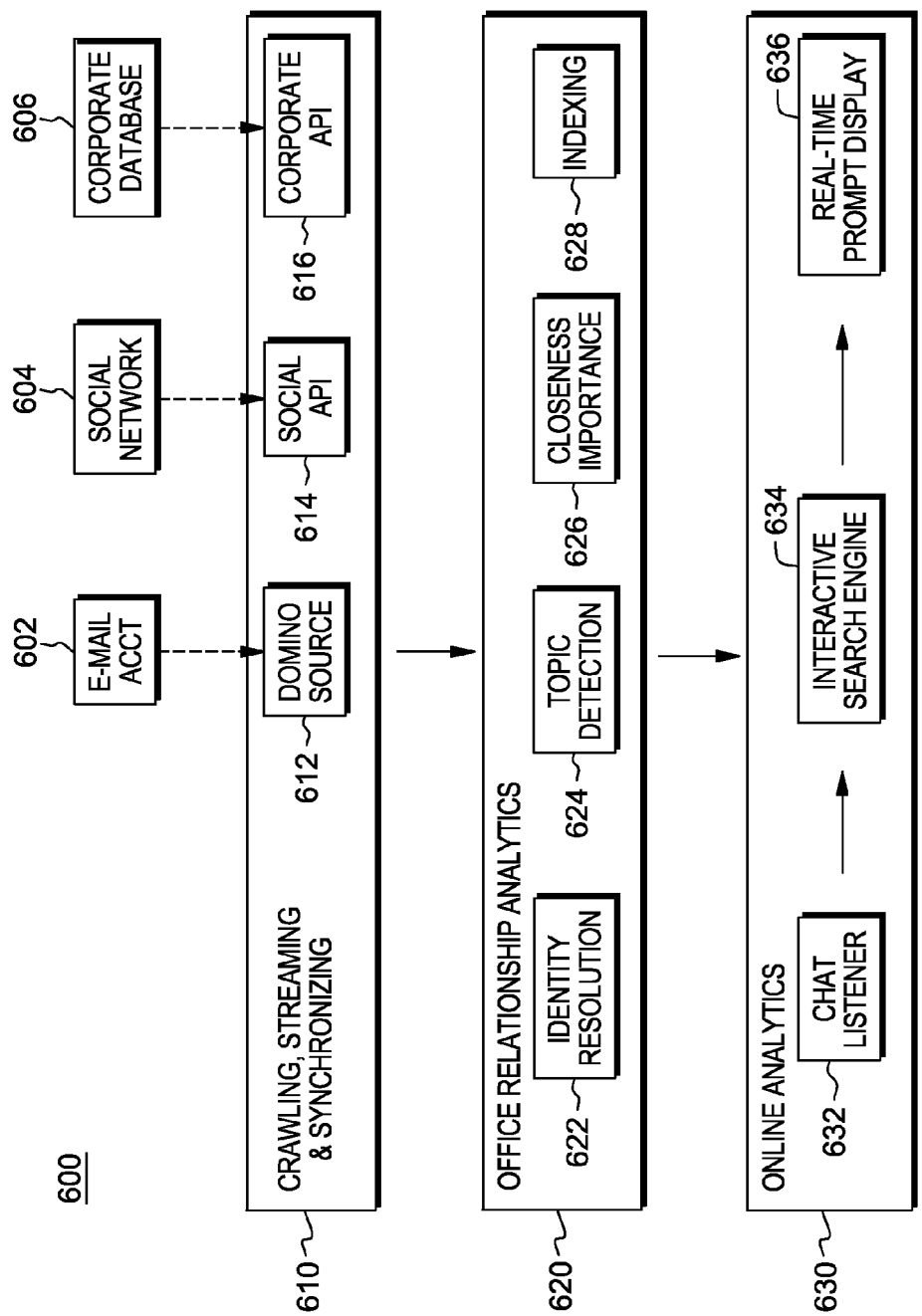
FIG. 6 is a flowchart showing a second method embodiment and corresponding second system embodiment of the present invention.

FIG. 6 is a flowchart showing process 600 including the processes: crawling, streaming, and synchronizing 610; offline relationship analytics 620; and online analytics 630 and corresponding system components: e-mail account 602; social network account 604; corporate database 606; domino source module 612; social application programming interface (API) module 614; corporate API module 616; identity resolution module 622; topic detection module 624; closeness importance module 626; indexing module 628; chat listener module 632; interactive search engine module 634; and real-time prompt display module 636 of one embodiment of the present invention.

Processing of process 600 begins at step 610, where domino source module 612 collects user's data and activities of e-mail account 602, social API module 614 collects user's data and activities of social network 604, and corporate API module 616 collects user's data and activities of corporate database 606.

Processing proceeds to step 620, where a relationship model is constructed in offline mode. The relationship model may be updated with any changes and/or new activities in the various networks according to inputs from step 610.

Processing proceeds to step 630, where chat listener module 632 monitors online chat activity, providing keywords and key personnel names to interactive search engine module 634. The interactive search engine provides input to real-time prompt display module 636, which displays key information about chat session participants and topic support.

Figure 7:
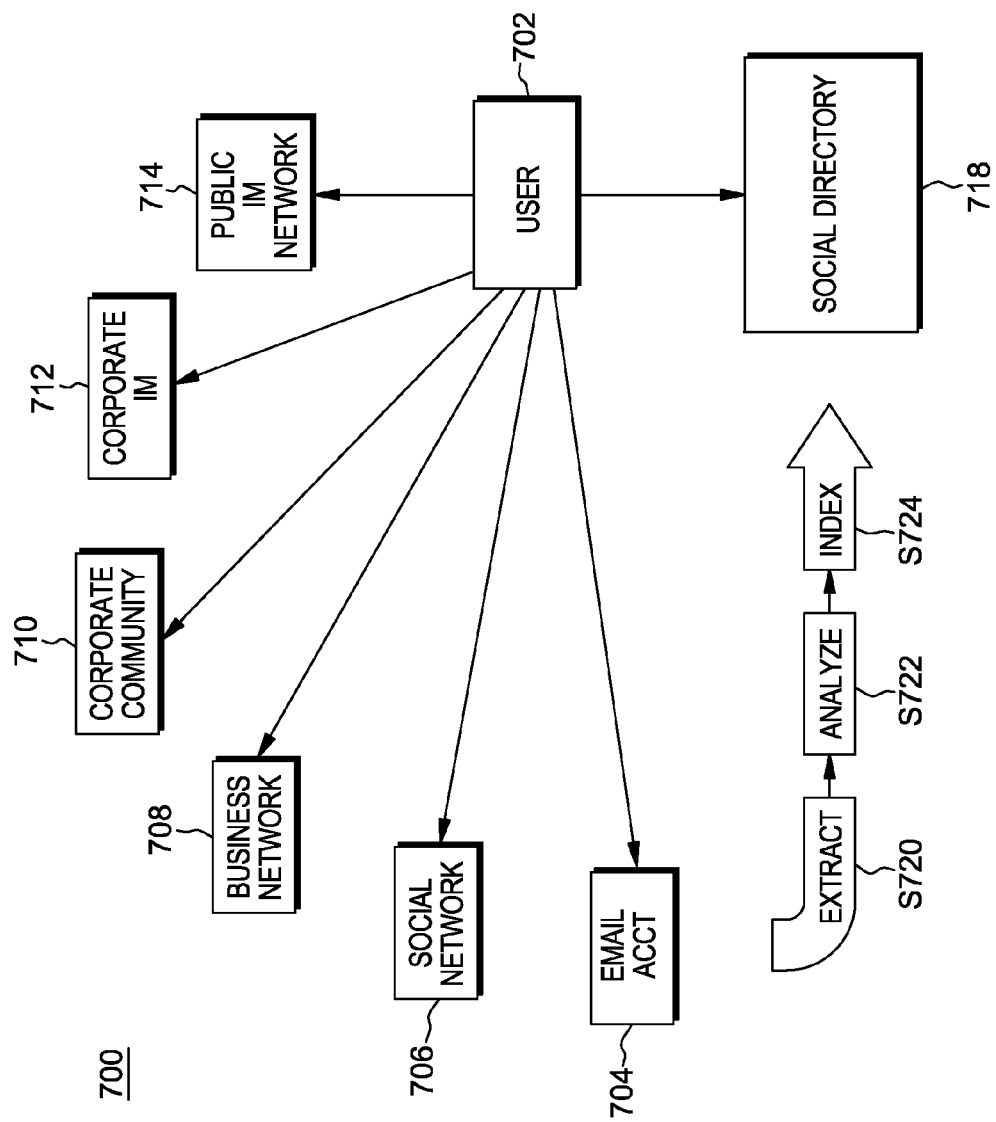
FIG. 7 is a flowchart showing a third method embodiment and corresponding third system embodiment of the present invention.

FIG. 7 is a flowchart depicting process 700, the building of a relationship model according to one embodiment of the present invention. Processing begins at step S720 where data extracted by user module 702 is collected for analysis. User module 702 extracts data from networking sites including: email account 704; social network 706; business network 708; corporate community 710; corporate IM 712; and public IM network 714.

Processing proceeds to step S722, where the collected data is analyzed to derive relationship data including the multi-dimensional social genome, discussed further below.

Processing proceeds to step S724, where the relationship data is indexed for quick access in social directory 718.

Figure 8:
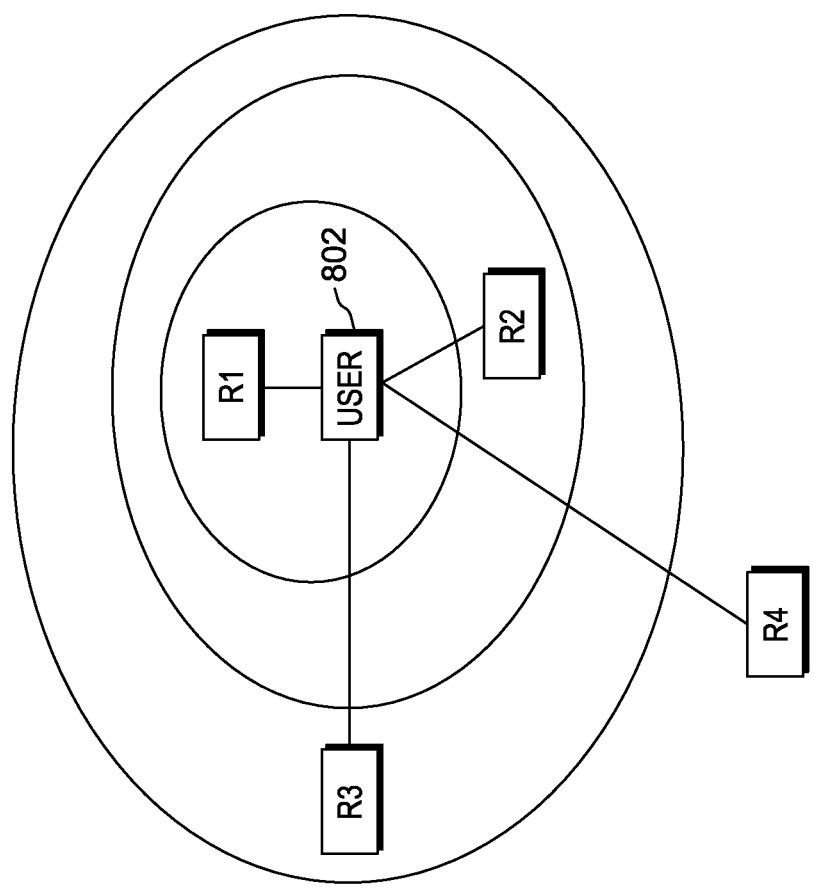
FIG. 8 is a diagram of a relationship map according to an embodiment of the present invention.

FIG. 8 is a diagram of a relationship map 800 according to one embodiment of the present invention showing the user 802 at the center of the map. In the relationship model, the relationships are divided into four categories: R1, contacts with whom the user is most familiar; R2, contacts the user knows; R3, contacts the user barely knows; and R4, contacts outside of the user's network. These categories are represented on the relationship map 800.

Referring back to FIG. 6, indexing module 628 associates a set of tags, also known as tag genomes, for each contact relationship to distinctly describe the relationship. A set of "reach through" relationships from categories R1 and R2 may be associated with each relationship in categories R3 and R4 on the relationship map.

Some embodiments of the present invention provide a system that helps a user to know their chatting partner in an IM environment without interrupting the regular flow of the chat session.

Some embodiments of the present invention provide a system that helps a user to understand the chat topic which might be misunderstood to one of the chat participants.

Some embodiments of the present inventions provide a system that interactively updates user prompts with reinforcement learning.

Some embodiments of the present invention build a profile of all of the user's contacts based on user's social data to facilitate a quick search of her chatting participants and chatting topics.

Some embodiments of the present invention recognize that not all friends in a user's contact list are close to the user. Some friends are added after only a casual encounter, such as just attending a leisure party, celebrating birthday parties, and attending weddings. Some friendships have become distant due to extended periods of no communication.

Some embodiments of the present invention recognize that in some IM tools, users don't necessarily know each other and that all known users may not be in a user's contact list until messages are sent to the known user. For example, a relationship may exist that is not documented by online activity.

Some embodiments of the present invention provide relationship analysis based on information available through an instant messaging system.

Some embodiments of the present invention use contact analysis to build a relationship model. Contact analysis is performed on communications and/or interactions between the user and her contacts to automatically derive multi-faceted social genome (tags) to characterize each relationship. For example, contact analysis may determine through a corporate connections community that contacts, Daniel and Charlie, each relocated in 2010.

According to Dunbar's number, the cognitive limit to the number of people with whom one can maintain stable social relationships is around 150. Some embodiments of the present invention recognize that an individual's social network oftentimes includes well over 150 contacts, especially when the network includes various popular and corporate networking groups. In those cases, if the user wants to figure out the details about contacts with whom she barely knows or simply cannot recall, she must resort to various tools, such as searching online or reviewing her emails and/or other contact history. Further, a user may want to identify contacts who are related to the topics and/or terms being discussed in a chat session. The manual endeavor to uncover this information may have no results and will at least require significant time investment. For example, the user may seek someone's full profile in an enterprise organizational database or search somebody's publications and their connections list on a business-oriented network.

Some embodiments of the present invention propose a method that is capable of providing detailed contact information in real-time, and that is seamlessly integrated into the instant messenger system without interrupting the chat session.

In some embodiments of the present invention, offline relationship analytics supports automated creation of a user's social directory and the ongoing updates to the social directory. Creating the social directory requires extracting and updating all contacts and/or relationships from multiple interaction channels. Relationship analysis includes extracting the "social genome" that uniquely characterizes each relationship in the user's social directory. When the social directory is operational, the user may refer to the social directory to optimize finding and understanding people and popular topics.

Some embodiments of the present invention, during an online chat session, spontaneously collect the profiles of the participants and/or the people mentioned in the text messages. The collected profiles and text messages are sent to the relationship model module to find the related people and contents. Some embodiments of the present invention post instantaneously on the side of IM tool the people and the content that are found.

Some embodiments of the present invention interactively update the model and chatting prompt information with reinforcement learning.

Some embodiments of the present invention partition a social map created by offline relationship analytics into four categories: R1, familiar people; R2, people known to the user; R3, people barely known to the user; and R4, people outside of the user's network. People in categories R1 and R2 can be used to reach people in categories R3 and R4.

Some embodiments of the present invention identify communication patterns, roles, recency, and frequency for analysis. For example, the ratio of live meetings to email may be meaningful, whether the ratio is 1:1 or 1:n, where n is greater than 5, and so forth. With regard to communications, a weighted score may be applied to whether the communication is: (i) from the user; (ii) to the user; and/or (iii) copied to the user (such as a "cc" e-mail). Also, response information may be informative, such as if a contact sent an e-mail that was never replied to, the communication may receive a spam identifier, or if a contact never sent email to the user, but only received e-mails from the user, a functional identifier may be used.

Figure 9A:
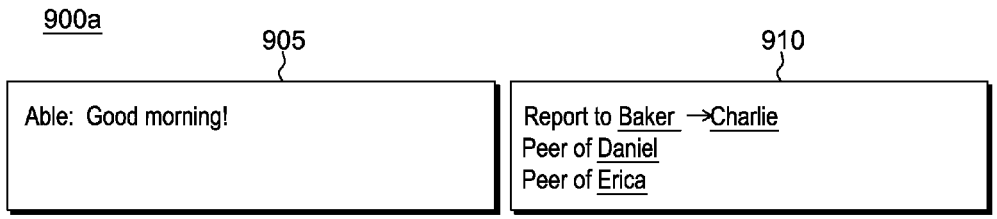
FIG. 9A is a second screenshot generated by an embodiment of the present invention.
Figure 9B:
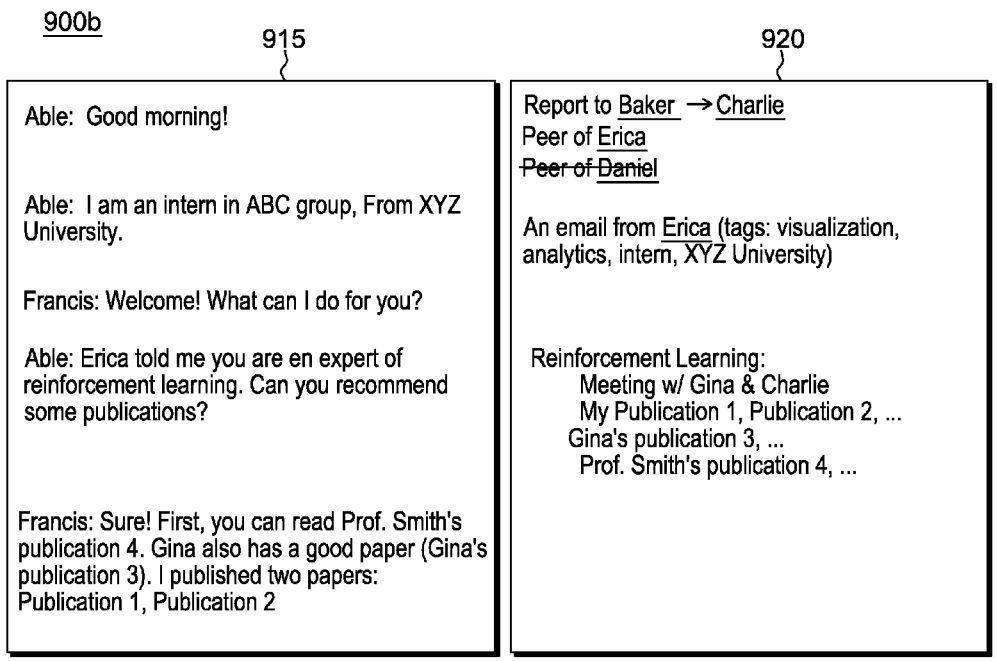
FIG. 9B is a third screenshot generated by an embodiment of the present invention.

FIGS. 9A and 9B show screenshots 900a and 900b from Francis's online chat with Able. In the example screenshots, a new intern, Able, has recently joined the company where Francis works. Chat window 905 shows Able's initial contact with Francis. Prior to this e-mail, Francis had no relationship with Able. Francis's online analytics tool provides data in support window 910. At this time, Francis can only see Able's reporting structure and peers based on the company database because there is no relationship model for the pairwise relationship between Francis and Able.

In FIG. 9B, Able continues to chat in chat window 915 by stating that he is an intern from XYZ University in ABC group. With this information, the relationship model is adjusted. The adjustment can be seen in support window 920, where Daniel is removed (shown in strikethrough) from the list of peers and a link is added to an e-mail communication from Erica with tags genomes relevant to the ongoing chat. Specifically, the email includes related tags, "intern," and "XYZ University." The tag genomes help Francis to recall the details of the e-mail with Erica. With this information now available, Francis is comfortable responding to Able's instant message.

Able proceeds to the main purpose of his chat by asking for help with the topic of reinforcement learning. Francis's online analytics tool responds by presenting various items in his relationship model related to reinforcement learning including: (i) meeting notes from a discussion with Gina and Charlie; (ii) Francis's publications on this subject; (iii) Gina's publications on the subject (one of Francis's network contacts); and (iv) XYZ University's Professor Smith's publications on the subject (another of Francis's network contacts and possible Able contact). Having this information at hand, Francis is able to easily answer Able with relevant information as shown in chat window 915.

Some embodiments of the present invention provide multi-dimensional social genome modeling. Challenges in modeling the social genome include: (i) volume of data; (ii) high-dimensional (unstructured) data analysis; and (iii) handling incremental updates. FIGS. 10A through 10F are useful references supporting the application of term frequency-inverse document frequency (tf-idf) to modeling word, people, and activity importance.

Figure 10A:
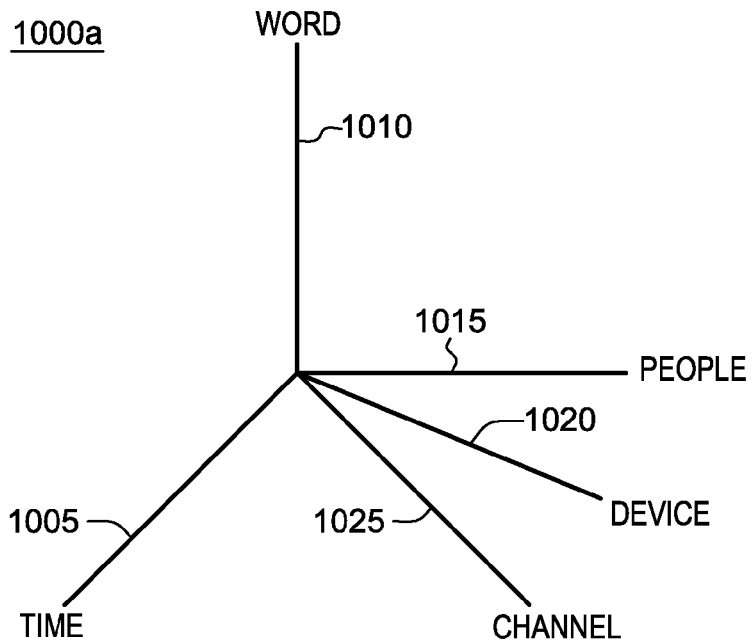
FIG. 10A is a first graph illustrating an algorithm associated with multi-dimensional social genome modeling according to an embodiment of the present invention.

FIG. 10A is a social genome graph illustrating an algorithm associated with multi-dimensional social genome modeling according to an embodiment of the present invention. Social genome graph 1000a shows five axes of a relationship model: time (T) 1005; word (W) 1010; people (P) 1015; device (D) 1020; and channel (D) 1025. The equation corresponding to activity instances, $a_j$, for the set of a user, u, and contact of interest, $p_l$, follows, where the activity instances are an element of the set of activities A:

$$a_j(u, p_l) \in A$$

$$a_j = W \times P \times C \times D \times T$$

Figure 10B:
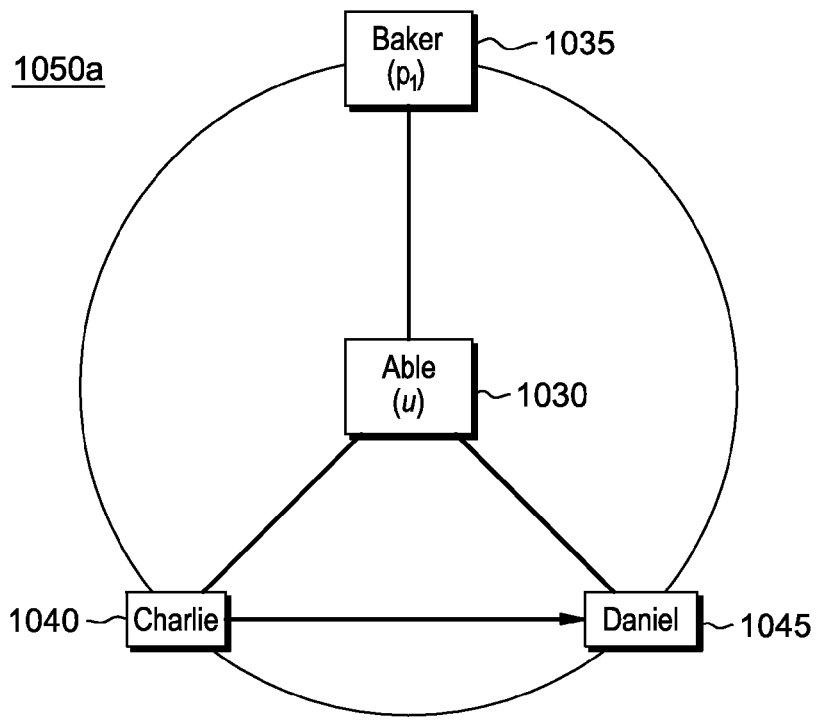
FIG. 10B is a first diagram illustrating an algorithm associated with multi-dimensional social genome modeling according to an embodiment of the present invention.

FIG. 10B is a social genome diagram illustrating an algorithm associated with multi-dimensional social genome modeling according to an embodiment of the present invention. Social genome diagram 1050a illustrates the set of activities A mapped into the set of relationships as a function of user, u, 1030 and the contact of interest, $p_l$, 1035. Other contacts that are within the set of relationships within the set of activities A are Charlie 1040 and Daniel 1045.

Figure 10C:
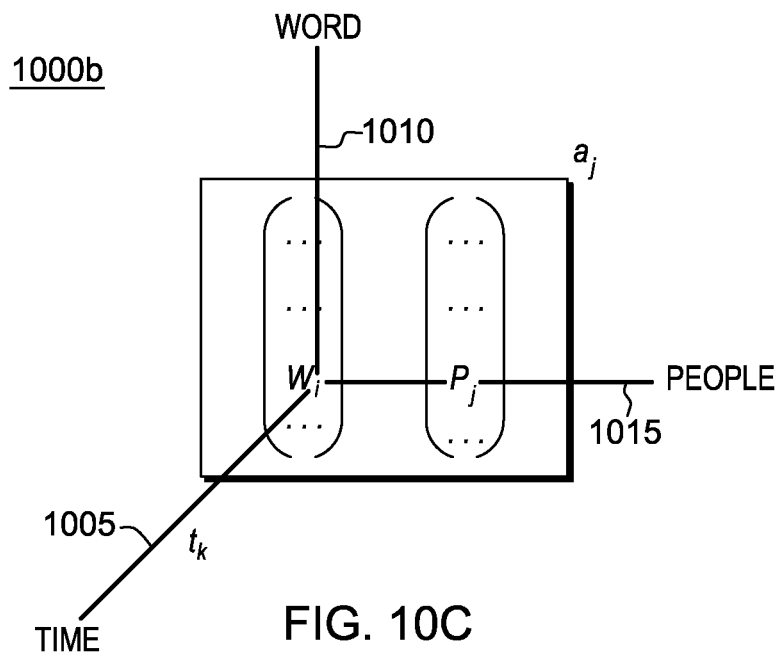
FIG. 10C is a second graph illustrating an algorithm associated with multi-dimensional social genome modeling according to an embodiment of the present invention.

FIG. 10C is a graph illustrating an algorithm associated with multi-dimensional social genome modeling for a given time, $t_k$, according to an embodiment of the present invention. Social genome graph 1000b shows data corresponding to activity instances, $a_j$, at a given time, $t_k$. The data includes the words, $w_i$, and people, $p_j$, related to the activity, $a_j$, at a given time, $t_k$. The data describes the "what" and "who" ranked by corresponding relative strengths or scores, for a given time mapped into the relationships, R, as a function of user, u, 1030 and the contact of interest, $p_l$, 1035 (see FIG. 10B). The equation corresponding to activity instances at a given time, $t_k$, follows:

$$a_j(u, p_l, t_k) \in A, a_j = \langle W(a_j), P(a_j) \rangle$$

Figure 10D:
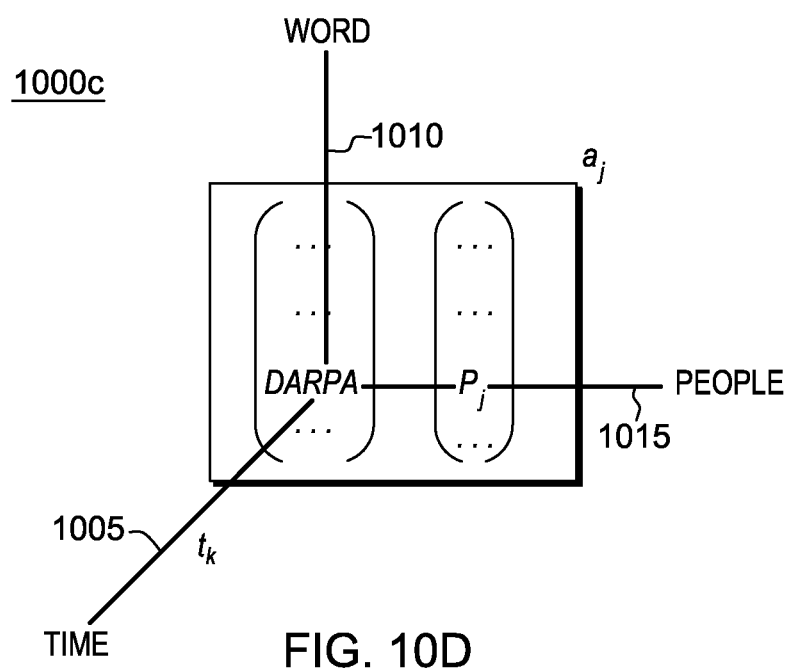
FIG. 10D is a third graph illustrating an algorithm associated with multi-dimensional social genome modeling according to an embodiment of the present invention.

FIG. 10D is a social genome graph illustrating an algorithm associated with multi-dimensional social genome modeling for the word DARPA at a given time, $t_k$, according to an embodiment of the present invention. Social genome graph 1000c shows data corresponding to activity instances, $a_j$, at a given time where the word DARPA occurs. The data output includes the people, $p_j$, related to the activity, $a_j$, at a given time, $t_k$, where the word DARPA occurs. The data describes the frequency of the occurrence of the word DARPA for a given time, $t_k$, for a given contact, $p_j$. The applicable equation is stated above with respect to FIG. 10B, where the word, W, is DARPA.

Figure 10E:
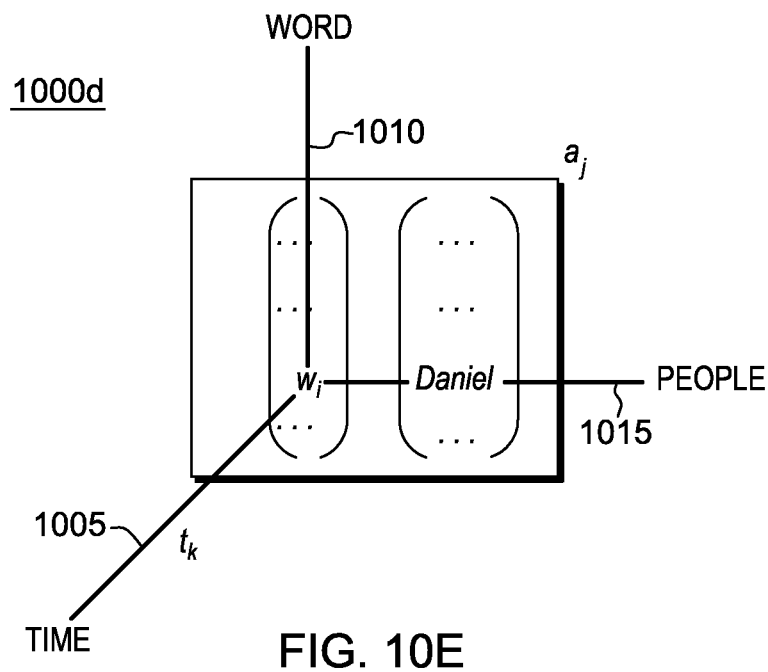
FIG. 10E is a fourth graph illustrating an algorithm associated with multi-dimensional social genome modeling according to an embodiment of the present invention.

FIG. 10E is a social genome graph illustrating an algorithm associated with multi-dimensional social genome modeling for the contact "Daniel" according to an embodiment of the present invention. Social genome graph 1000d shows data corresponding to activity instances, $a_j$, at a given time, $t_k$, where the contact name "Daniel" occurs. The data describes the frequency of the occurrence of the contact Daniel at a specified time, $t_k$, for a particular word. The applicable equation is stated above with respect to FIG. 10B, where the contact, P, is Daniel.

Figure 10F:
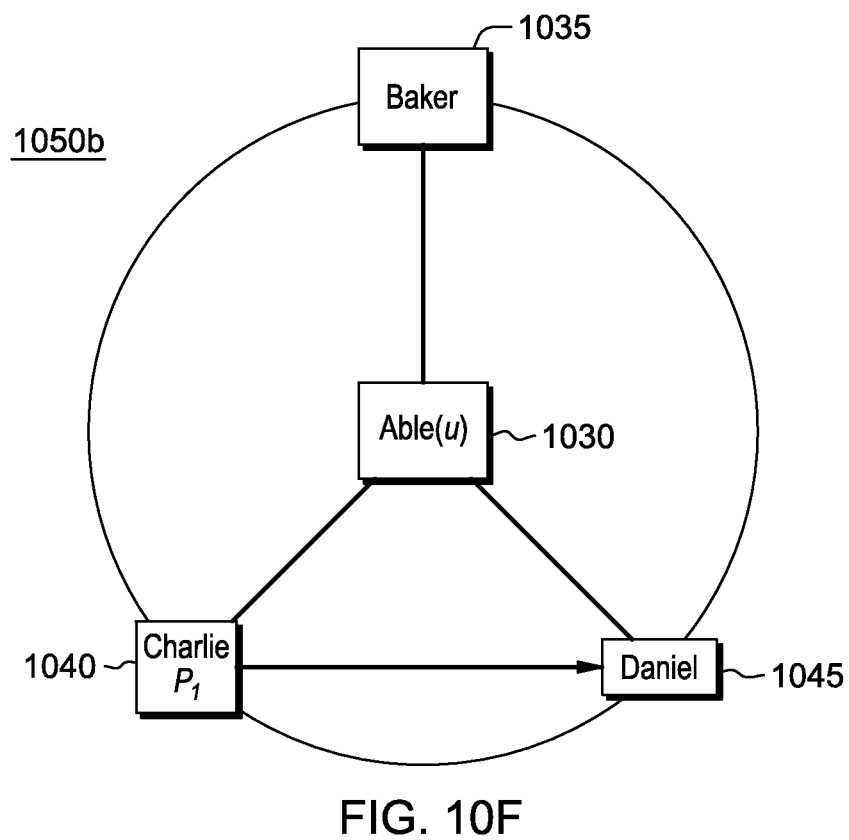
FIG. 10F is a second diagram illustrating an algorithm associated with multi-dimensional social genome modeling according to an embodiment of the present invention.

FIG. 10F is a social genome diagram illustrating an algorithm associated with multi-dimensional social genome modeling for the contact "Daniel" according to an embodiment of the present invention. Social genome diagram 1050b illustrates the set of activities, A, mapped into the set of relationships, R, as a function of user, u, 1030 and the contact of interest, $p_l$, 1040 where the contact "Daniel" is mentioned. Other contacts that are within the set of relationships within the set of activities A are Baker 1035 and Daniel 1045.

Tf-idf is a numerical statistic which reflects how important a word is to a document that is part of a larger collection or corpus. It is often used as a weighting factor in information retrieval and text mining. The Tf-idf value increases proportionally to the number of times a word appears in the document, but is offset by the frequency of the word in the corpus, which helps to control for the fact that some words are generally more common than others.

Some embodiments of the present invention apply the principles of inverse document frequency (idf) to activity and people associated with the relationship between two persons, where activity is a function of words, people, devices, channels, and time. Inverse activity frequency (iaf) reflects how important a word is to an activity in a set of activities associated with the relationship between two people. Inverse people frequency (ipf) reflects how important certain people are in a set of people associated with the relationship between two people. The iaf is obtained, for example, by dividing the total number of activities associated with the relationship between two people by the number of activities containing a specified word, and then taking the logarithm of that quotient. The equations for iaf and ipf are as follows:

Modeling Word Importance with Reference to the TF-IDF Model:

$$\varphi(w_i, t_k, p_l | u, a_j, \mathcal{A}, \mathcal{T}, \mathcal{P}) = R(u, a_j) * R(p_l, a_j) * wf(w_i, a_j) * iaf(w_i, \mathcal{A}) * itf(w_i, \mathcal{T}) * ipf(w_i, \mathcal{P})$$

Inverse Activity Frequency:

$$iaf(w_i, \mathcal{A}) = \log\left(\frac{|\mathcal{A}|}{|a \in \mathcal{A} : w_i \in W(a)|}\right)$$

Inverse People Frequency:

$$ipf(w_i, \mathcal{P}) = \log\left(\frac{|\mathcal{P}|}{|p \in P : w_i \in W(p)|}\right)$$

An equation to find a set of words which best characterizes the relationship between a user, u, and a contact, $p_l$, follows:

$$\{w_{ii}\} = \max_{w_i}(\mathcal{R}(w_i | u, p_l, \mathcal{A}, \mathcal{T}, \mathcal{P}))$$

$$= \max_{w_i}\left(\sum_{a_j \in \mathcal{A}: w_i \in a_j, p_l \in a_j} \varphi(w_i, p_l | u, a_j, \mathcal{A}, \mathcal{T}, \mathcal{P})\right)$$

An equation to find a set of people who are most associated with the relationship between a uses, u, and a contact, $p_l$, follows:

$$\{p_{ll}\} = \max_{p_{l'}}(\mathcal{R}(p_{l'} \mid u, p_l, \mathcal{A}, \mathcal{T}, \mathcal{P}))$$

$$= \max_{p_{l'}} \left( \sum_{a_j \in \mathcal{A}: p_l \in a_j, p_{l'} \in a_j} \sum_{w_i \in a_j} \varphi(w_i, p_{l'} \mid u, a_j, p_l, \mathcal{A}, \mathcal{T}, \mathcal{P}) \right)$$

Some embodiments of the present invention interactively update the relationship model with reinforcement learning. Reinforcement learning includes the following concepts: (i) learning from the consequences of actions, rather than from being explicitly taught; (ii) selecting an action to take on the basis of past experiences (exploitation); and (iii) making new choices (exploration), which is essentially trial and error learning.

Some embodiments of the present invention apply the following process components to profile a new contact in order to understand people: (i) encounter a new contact; (ii) find a sub-network related to the new contact; (iii) extract relevant contact information; (iv) and fuse relevant contact information to complete a new contact profile; (v) interact with the new contact and/or potential connections to obtain more information to refine the contact profile.

Some embodiments of the present invention practice the above process component with the following objective: (i) minimize the cost; and/or (ii) maximize the information gain.

Some embodiments of the present invention provide a method to build a relationship model for all the contacts with user's social data. The method consists of: (i) automated creation and update of one's social directory by extracting and updating all contacts/relationships from multiple interaction channels; (ii) extract the so-called "multi-dimensional social genome" that uniquely characterizes each relationship in the social directory; (iii) build an index for each contact in one's social directory which consists of a set of key words & time that best characterize the relationship, to facilitate the quick search of his chatting participants and chatting topic.

Some embodiments of the present invention provide a method that helps a user to understand a chatting topic that might be vague to one or more of the chatting participants. The method consists of: (i) spontaneously collect the profiles of the involvers or the people mentioned in the text messages; (ii) profiles and text messages are sent to relationship model to find the related people and contents; and (iii) finally, the found people and content are prompted instantaneously on the side of IM tool.

Some embodiments of the present invention provide a system that interactively updates the relationship model and chatting prompt with reinforcement learning.

Some embodiments of the present invention focus on assisting online chats with real-time prompts of relationships.

Some embodiments of the present invention provide a method of facilitating online chat with acquired knowledge of the relationship between sender and receiver.

Some embodiments of the present invention derive a relationship model from personal communications (such as email and prior chats) and social websites (such as Linkedin, Facebook, and etc.). (Note: the term(s) "Linkedin" and/or "Facebook" may be subject to trademark rights in various jurisdictions throughout the world and are used here only in reference to the products or services properly denominated by the marks to the extent that such trademark rights may exist.)

Some embodiments of the present invention go beyond the relationship between sender and receiver, but also takes into account other aspects of the relationship model, such as what ("relocation"), who ("Daniel", "Charlie"), when ("2010"), and how ("Connections community").

Some embodiments of the present invention take into account the temporal aspect of the relationship model, such as, "when did the sender and/or receiver interact before?", and "how did their relationship evolve over time?."

Some embodiments of the present invention take into account the topics that the sender and/or receiver have discussed in the past Some embodiments of the present invention assist a chat participant with reminders of all the faceted information (what, who, when & how) that is associated with participant relationships, without interrupting the regular chatting. See sample chat in FIGS. 5A through 5C.

Some embodiments of the present invention use a multi-dimensional social genome model to analyze the user's social network.

Some embodiments of the present invention integrate social network information with the user's IM network.

Some embodiments of the present invention take into account the content of what contacts have communicated in the past.

Some embodiments of the present invention apply a relationship model to support applications including: (i) online chat; (ii) people search; (iii) getting-to-know-you type applications; and/or (iv) expertise locator.

Some embodiments of the present invention dynamically update an existing relationship model during online chat sessions by: (i) adding new contacts; (ii) deriving any existing connections between new contact and those contacts already identified within the relationship model; (iii) characterizing topics of discussion with new contact; (iv) distinguishing topics discussed with the new contact and existing contacts based on: (a) distinct words; (b) common contacts; and (c) distinct activities.

Some embodiments of the present invention apply rudimentary, ad-hoc analytics to identify people and relationships during a chat session.

Some embodiments of the present invention go beyond rudimentary, ad-hoc analytics, but apply a sophisticated incremental approach to relationship model maintenance by gathering information during: (i) chat sessions, (ii) phone calls; and (iii) e-mail communications.

Some embodiments of the present invention draw upon Twitter postings to determine whether a sub-set of contacts are complaining of the same problem by identifying a distinct word frequently appearing in posted tweets. (Note: the term(s) "TWITTER" and/or "TWEET" may be subject to trademark rights in various jurisdictions throughout the world and are used here only in reference to the products or services properly denominated by the marks to the extent that such trademark rights may exist.)

Some embodiments of the present invention build a relationship model using people analytics by: (i) automatically extracting the relationship between two people; and/or (ii) characterizing the relationship between two people. Characterization of the relationship between two people includes: (i) tie strengths; and/or (ii) unique topics.

Some embodiments of the present invention provide the user with an understanding of who a chat partner is, especially if such a person is a stranger. This understanding includes: (i) how the chat partner may be related to someone in the user's social network, or user's contacts; and/or (ii) what the chat partner's relationship with the user's contact look like.

Some embodiments of the present invention help the user to: (i) understand people; and/or (ii) make connections.

Some embodiments of the present invention focus on relationship analytics and understanding to enable a user to better understand and converse with another user. The relationship between the two users may be quite tenuous, that is, there may be no direct relationship between the two users, but there is merely a network of colleagues that is extracted to connect the two users. The characteristics of a relationship may include multiple facets that point to patterns used to characterize the relationship between two people. Facets include: (i) who; (ii) what; (iii) how; and/or (iv) when.

Some embodiments of the present invention perform pair-wise people relationship analytics to find ways to help connect two people. Pair-wise analytics includes: (i) the unique topics discussed by each person; and/or (ii) relationship strength based on word use.

Some embodiments of the present invention go beyond identifying the topics of discussion between chat participants by building a relationship model that includes communication data comprised on the multiple facets of a relationship including: (i) who; (ii) when; (iii) what; and/or (iv) how.

Some embodiments of the present invention use the term "social genome" to mean various attributes associated with those activities (email, chats, social posts, status updates, documents, etc.) to which social relationships are comprised of at its finest granularity. Those attributes include, but are not limited to: (i) words; (ii) time; (iii) people; (iv) channel (such as email, social network posts, etc.); and/or (v) device (such as cell phone, personal computer, other mobile devices, etc.).

Some embodiments of the present invention treat the "social genome" and associated attributes (Word, Time, People, Channel), as more than static entities, but as dynamic entities, where each of the attributes interact with each other, such that they are changing dynamically. The term "multi-dimensional social genome" refers to the model used to determine the interaction patterns between those features with respect to a specific relationship.

Some embodiments of the present invention answer questions such as "find a set of people/words/time/channels which can characterize a pairwise relationship between user and a contact as distinguished from among all the other user's contacts."

Some embodiments of the present invention determine the interaction patterns between the attributes of the social genome for a given social directory. Further, some embodiments of the present invention analyze pairwise relationships.

Some embodiments of the present invention examine the fine-grained pairwise relationships between an owner of a social directory and each of her contacts.

Some embodiments of the present invention examine the overall structure of a social network. Some embodiments of the present invention identify the influential individuals in a social network. Still other embodiments of the present invention focus on people searching and recommending SMEs.

Pairwise relationships are derived from a relationship model where a set of relationship data exists for each unique pair of users in the system. For example, where USER X's social directory including A, B, and C, pairwise relationship data sets include: (i) X-A; (ii) X-B; and (iii) X-C. In some embodiments, the relationship data set is multi-dimensional. In some embodiments, the multi-dimensional relationship data set for each pair is dynamic. In some embodiments, inverse frequency analysis is used to help determine and define what is unique about a pairwise relationship (e.g. X-A) among all his contacts (X to everybody else).

III. The Hardware and Software Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
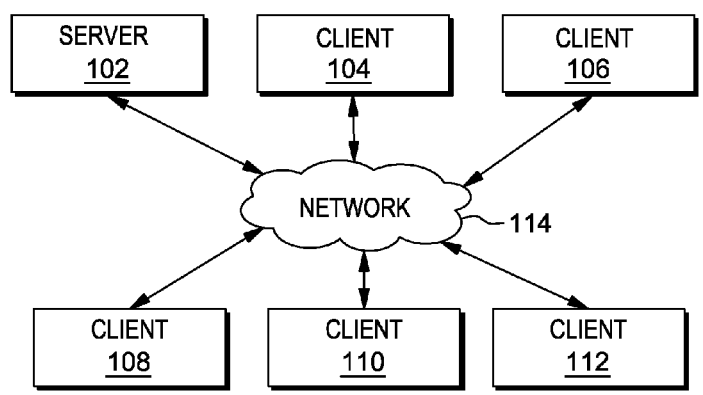
FIG. 1 is a schematic view of a first embodiment of a networked computers system according to the present invention.
Figure 2:
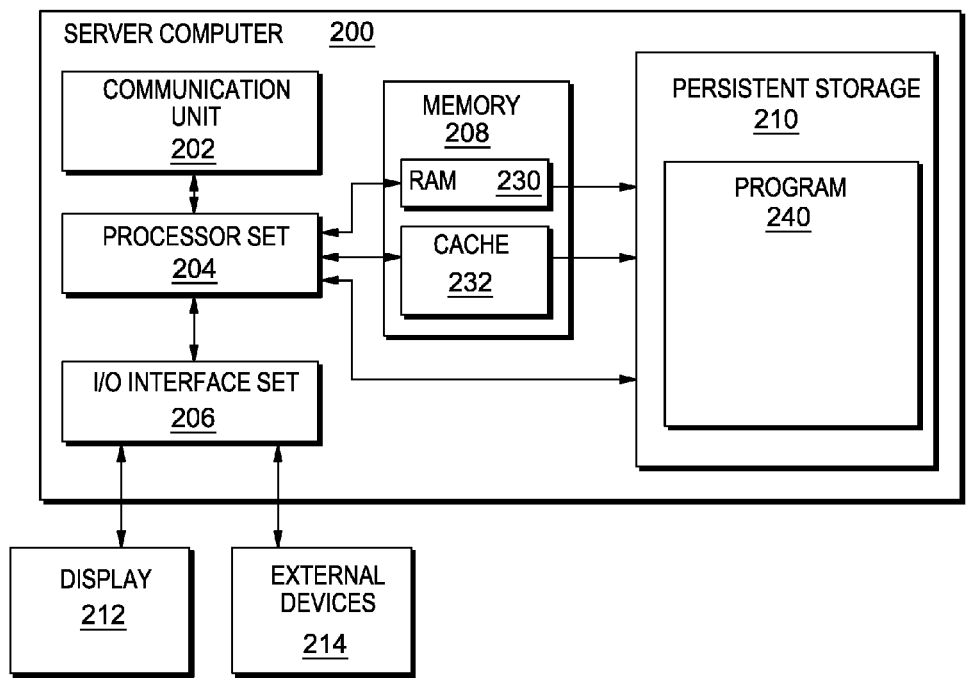
FIG. 2 is a schematic view of a server computer subsystem portion of the first embodiment system.

An embodiment of a possible hardware and software environment for software and/or methods according to the present invention will now be described in detail with reference to the Figures. FIGS. 1 and 2 collectively make up a functional block diagram illustrating various portions of distributed data processing system 100, including: server computer sub-system (that is, a portion of the larger computer system that itself includes a computer) 102; client computer sub-systems 104, 106, 108, 110, 112; communication network 114; server computer 200; communication unit 202; processor set 204; input/output (i/o) interface set 206; memory device 208; persistent storage device 210; display device 212; external device set 214; random access memory (RAM) devices 230; cache memory device 232; and program 240.

As shown in FIG. 2, server computer sub-system 102 is, in many respects, representative of the various computer sub-system(s) in the present invention. Accordingly, several portions of computer sub-system 102 will now be discussed in the following paragraphs.

Server computer sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 240 is a collection of machine readable instructions and/or data that is used to create, manage and control certain software functions that will be discussed in detail, below, in the First Embodiment(s) sub-section of this Detailed Description section.

Server computer sub-system 102 is capable of communicating with other computer sub-systems via network 114 (see FIG. 1). Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

It should be appreciated that FIGS. 1 and 2, taken together, provide only an illustration of one implementation (that is, system 100) and does not imply any limitations with regard to the environments in which different embodiments may be implemented. Many modifications to the depicted environment may be made, especially with respect to current and anticipated future advances in cloud computing, distributed computing, smaller computing devices, network communications and the like.

As shown in FIG. 2, server computer sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 240 is stored in persistent storage 210 for access and/or execution by one or more of the respective computer processors 204, usually through one or more memories of memory 208. Persistent storage 210: (i) is at least more persistent than a signal in transit; (ii) stores the device on a tangible medium (such as magnetic or optical domains); and (iii) is substantially less persistent than permanent storage. Alternatively, data storage may be more persistent and/or permanent than the type of storage provided by persistent storage 210.

Program 240 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102, such as client sub-systems 104, 106, 108, 110, 112. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 240, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: non-exclusive or; for example, A and/or B means that: (i) A is true and B is false; or (ii) A is false and B is true; or (iii) A and B are both true.

User/subscriber: includes, but is not necessarily limited to, the following: (i) a single individual human; (ii) an artificial intelligence entity with sufficient intelligence to act as a user or subscriber; and/or (iii) a group of related users or subscribers.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Software storage device: any device (or set of devices) capable of storing computer code in a non-transient manner in one or more tangible storage medium(s); "software storage device" does not include any device that stores computer code only as a signal.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

Social Genome: the entirety of a user's communications data including, but not limited to: words, time, other users, channels, and devices extracted from communication sources including, but not limited to: email, chats, social posts, status updates, documents, publications, GPS, and telephone communications.

Correspondence: the words used in communication(s) made by one user that is directed to a finite and relatively determinative set of other users, or participants. A communication is directed to other users when: (i) the communication is not expressed for public consumption (published articles and/or books are expressed for public consumption); and (ii) the communication comprises more than responding to questionnaires or applications.

Participates: a user participates in a correspondence when the user is: (i) the author or speaker of the communication, or (ii) a member of the finite and relatively determinative set of other users to whom the correspondence is directed.

What is claimed is:

1. A computer program product comprising a non-transitory computer readable storage medium having program code embodied therewith, the program code is executable by a processor to:
   collect basis data related to a pair of people, the pair of people consisting only of a first person and a second person;
   create a pairwise relationship data set including a who attribute portion and a what attribute portion, the pairwise relationship data set corresponding to a pairwise entity including only the pair of people;
   define the who attribute portion of the pairwise relationship data set by storing, for the pairwise entity: (i) first person data related to the identity of the first person, and (ii) second person data related to the identity of the second person;
   define the what attribute portion of the pairwise relationship data set by storing, for the pairwise entity, topic data, with the topic data being: (i) based on the basis data related to the pair of people, and (ii) pre-determined topics of interest to the pairwise entity;
   monitor an online chat session between the pair of people; and send, to the first person, an electronic message including a portion of the topic data;
wherein:
the basis data includes the first person data, the second person data, and the topic data.

2. The computer program product of claim 1 wherein:
the what attribute portion includes a word dimension with words, other than proper names, of common use between the pair of people; and
the what attribute portion is further defined by storing, for the pairwise entity, identities of people of mutual interest to the pair of people.

3. The computer program product of claim 1 wherein the definition by storing of the what attribute portion includes:
performing text analytics on at least a portion of the basis data in order to determine the topic data.

4. The computer program product of claim 1 wherein the definition by storing of the what attribute portion includes:
performing inverse frequency processing on at least a portion of the basis data in order to determine the topic data.

5. The computer program product of claim 1 wherein the basis data includes correspondence data of the pair of people.

6. The computer program product of claim 1 wherein:
the portion of the pairwise relationship data set includes a portion of the topic data.

7. The computer program product of claim 1 wherein:
correspondence data includes communications between the first person and the second person during a chat session, the communications being weighted according to relevance; and
an exclusive communication is weighted more than non-exclusive communication.

8. The computer program product of claim 1 wherein the program code is further executable by a processor to:
update the pairwise relationship data set in real time based at least in part on basis data collected during a chat session between the first person and the second person.

9. The computer program product of claim 1 wherein the basis data is collected, at least in part, from published communications data.

10. A system comprising:
a memory having computer readable computer instructions; and
a processor for executing the computer readable instructions, the instructions including:
collecting basis data related to a pair of people, the pair of people being including consisting only of a first person and a second person;
creating a pairwise relationship data set including a who attribute portion and a what attribute portion, the pairwise relationship data set corresponding to a pairwise entity including only the pair of people;
defining the who attribute portion of the pairwise relationship data set by storing, for the pairwise entity: (i) first person data related to the identity of the first person, and (ii) second person data related to the identity of the second person;
defining the what attribute portion of the pairwise relationship data set by storing, for the pairwise entity, topic data, with the topic data being: (i) based on the basis data related to the pair of people, and (ii) pre-determined topics of interest to the pairwise entity;
monitoring an online chat session between the pair of people; and sending, to the first person, an electronic message including a portion of the topic data;
wherein:
the basis data includes the first person data, the second person data, and the topic data.

11. The system of claim 10 wherein:
the what attribute portion includes a word dimension with words, other than proper names, of common use between the pair of people; and
the what attribute portion is further defined by storing, for the pairwise entity, identities of people of mutual interest to the pair of people.

12. The system of claim 10 wherein the definition by storing of the what attribute portion includes:
performing text analytics on at least a portion of the basis data in order to determine the topic data.

13. The system of claim 10 wherein the definition by storing of the what attribute portion includes:
performing inverse frequency processing on at least a portion of the basis data in order to determine the topic data.

14. The system of claim 10 wherein the basis data includes correspondence data of the pair of people.

15. The system of claim 10 wherein:
the portion of the pairwise relationship data set includes a portion of the topic data.

16. The system of claim 10 wherein:
correspondence data includes communications between the first person and the second person during a chat session, the communications being weighted according to relevance; and
an exclusive communication is weighted more than non-exclusive communication.

17. The system of claim 10 wherein the instructions further include:
updating the pairwise relationship data set in real time based at least in part on basis data collected during a chat session between the first person and the second person.

18. The system of claim 10 wherein the basis data is collected, at least in part, from published communications data.

19. A computer-implemented method comprising:
creating a pairwise relationship data set including a who attribute portion and a what attribute portion, the pairwise relationship data set corresponding to a pairwise entity including only the pair of people consisting only of a first person and a second person;
generating first person data including first identity data related to an identity of the first person and first interest data related to topics of interest of the first person;
generating second person data including second identity data related to an identity of the second person and second interest data related to topics of interest of the second person;
defining the who attribute portion of the pairwise relationship data set by storing: (i) first identity data, and (ii) second identity data;
defining the what attribute portion of the pairwise relationship data set by storing, for the pairwise entity, topic data, with the topic data being: (i) based on basis data including first interest data and second interest data, and (ii) pre-determined topics of interest to the pairwise entity;
monitoring an online chat session between the pair of people; and sending, to the first person, an electronic message including a portion of the topic data.

20. The computer-implemented method of claim 19, further comprising:
monitoring a communication by the pairwise entity to capture correspondence data;
identifying relevant words in the correspondence data;
amending the basis data to include the relevant words; and
updating the what attribute portion with the amended basis data.

* * * * *